US006546578B1

United States Patent
Steinmeier

(10) Patent No.: US 6,546,578 B1
(45) Date of Patent: Apr. 15, 2003

(54) SEAT CUSHION FOR VEHICLE SEATS

(75) Inventor: Horst Steinmeier, Lobbecke (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/647,273

(22) PCT Filed: Mar. 27, 1999

(86) PCT No.: PCT/EP99/02114
§ 371 (c)(1),
(2), (4) Date: Feb. 6, 2001

(87) PCT Pub. No.: WO99/50090
PCT Pub. Date: Oct. 7, 1999

(51) Int. Cl.[7] .............................................. A47C 27/15
(52) U.S. Cl. ........................ 5/653; 5/724; 297/452.46; 297/452.48
(58) Field of Search ........................... 5/653, 654, 736, 5/740, 655.9, 724, 726, 944; 297/452.46, 452.48, 180.1; D6/601

(56) References Cited

U.S. PATENT DOCUMENTS

| 2,141,271 A | * | 12/1938 | Gerlofson | 5/653 |
|---|---|---|---|---|
| 3,298,046 A | * | 1/1967 | Clementi et al. | 297/452.48 |
| 3,381,999 A | | 5/1968 | Steere | |
| 3,506,308 A | | 4/1970 | Fenton | |
| 3,605,145 A | | 9/1971 | Graebe | |
| 3,974,532 A | * | 8/1976 | Ecchuya | 5/740 |
| 4,143,916 A | | 3/1979 | Trotmann et al. | |
| 4,522,447 A | * | 6/1985 | Snyder et al. | 5/653 |
| 4,673,605 A | * | 6/1987 | Sias et al. | 5/724 |
| 4,686,724 A | * | 8/1987 | Bedford | 5/736 |
| 4,847,933 A | * | 7/1989 | Bedford | 5/653 |
| 4,980,940 A | * | 1/1991 | Issmiki | 5/740 |
| 5,079,790 A | * | 1/1992 | Pouch | 5/653 |
| 5,403,065 A | | 4/1995 | Callerio | |
| 5,408,711 A | * | 4/1995 | McClelland et al. | 5/653 |
| 5,850,648 A | * | 12/1998 | Morson | 5/944 |

FOREIGN PATENT DOCUMENTS

| DE | 21 36 947 | 2/1971 |
| DE | 39 28 883 | 3/1991 |
| GB | 207 6648 | 6/1981 |

* cited by examiner

Primary Examiner—Alexander Grosz
(74) Attorney, Agent, or Firm—Foley & Lardner

(57) ABSTRACT

A seat cushion for vehicle seats is disclosed. The seat cushion includes a seating surface and a core including a plurality of cylindrical tubular sections generally extending perpendicular to the seating surface.

20 Claims, 1 Drawing Sheet

SEAT CUSHION FOR VEHICLE SEATS

CROSS-REFERENCE TO RELATED APPLICATIONS

The present application is U.S. National Phase application based on a parent PCT application, Int'l App. No. PCT/EP99/02114, titled "SEAT CUSHION FOR VEHICLE SEATS" having a priority date of Apr. 1, 1998, which is incorporated by reference herein.

FIELD OF THE INVENTION

The present invention relates to a seat cushion for vehicle seats, comprising at least one core part consisting of an elastic plastic foam.

BACKGROUND

An example of such a seat cushion is known from DE3928883C2. This cushion part is for a seat provided with a climatic zone and is supposed to feature good comfort with respect to seating and air-conditioning. But the known cushion part is constructed relatively expensively, because it consists of fairly many component parts. A first core part comprising a plastic foam material is arranged within a shell-shaped base element. A cover element is exchangeably arranged in a recess of the base element. This cover element possesses another core made of plastic foam material, whose hardness is supposed to be greater than the hardness of the other core. The cover element is equipped with hollows that are designed conically extended toward the top surface, which is turned away from the base element. On the bottom surface, which faces the base element, the cover element is designed with projecting parts that are separated from each other, a hollow space being formed between them. This hollow space extends continuously between the base element and cover element, and it is fluidly connected with the cushion part's top surface by openings. A section of each opening extends through the cover element, core, and cover element's case; these openings open into the hollows. Additional openings are formed on the perimeter of the cover element's outer rim. Air channels, which are fluidly connected with the hollow space located between the base element and cover element, are designed on the base element. The air channels form exhaust openings through which air can escape from the hollow space, wherein this air can be loaded with moisture. A natural chimney effect is therefore supposed to eliminate moisture from the top of the cushion part and through the hollow space.

Besides this, so-called active climatic seats are also known (see U.S. Pat. No. 5,403,065, for example), in which electrical fans (ventilators) provide continuous air circulation in the seat area. Naturally, such systems are particularly costly and expensive.

SUMMARY

It is the objective of the invention to create a seat cushion of the generic type mentioned in the introduction, which is distinguished by structural simplicity and simpler manufacturability resulting therefrom, while simultaneously offering optimum climatic and seating comfort.

This is achieved according to invention, that the side of the core part which faces towards the sitting surface and at least a sub-area of the sitting surface consist of several adjacent tubular sections which are molded to a base section of the core part on one side and basically extend perpendicularly in relation to the sitting surface.

Consequently there preferably exists only one single core part, wherein the foamed tubular sections, which basically extend perpendicularly to the sitting surface, define the carrying and supporting properties. These sections can be very simply adapted to the respective requirements for optimum vibrational comfort and optimum distribution of the sitting pressure, preferably by proper shaping alone; that is above all by designing the supporting tube cross sections and/or open lengths of the individual tubular sections. Certainly, it would fundamentally also be possible to introduce alternative or additional different foam materials with different physical properties.

For good climatic comfort, it is planned that the tubular sections feature holes that extend through the core part completely, including the base section, and consequently have open edges on both sides. The penetrating holes allow air and moisture to be exchanged throughout the core part effectively, advantageously without active means such as ventilators or the like. According to invention, we are therefore dealing with a purely passive air-conditioning system that is very simple and economical.

Additional advantageous design characteristics of the invention are contained in both the dependent claims and the following description.

DESCRIPTION OF THE FIGURES

The invention will be described in more detail based on a preferred example illustrated in the drawing. It shows.

DETAILED DESCRIPTION OF PREFERRED AND OTHER EXEMPLARY EMBODIMENTS

Figure 1:
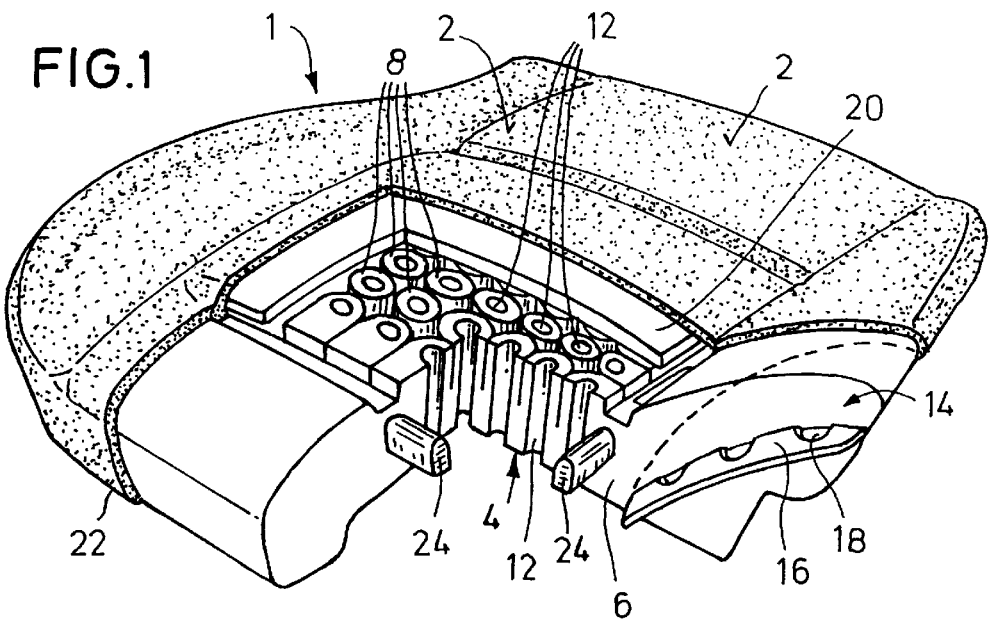
FIG. 1 a partially cut perspective view of a seat cushion according to invention, and FIG. 2 an enlarged perspective view of a sub-area cut out from the seat cushion.

The seat cushion 1 illustrated in FIG. 1, conceived as a bottom seat part in particular, can also be used for an automotive seat back if necessary. The seat cushion 1 features a top sitting surface 2, which is shaped in an ergonomic manner. A core part 4, consisting of an elastic plastic foam, is arranged within the seat cushion 1.

According to the invention, the core part 4 consists of a bottom base section 6, which is arranged on the bottom side turned away from the sitting surface 2, and of numerous adjacent tubular sections 8, which are molded to the base section 6 on one side and extend essentially perpendicular in relation to the sitting surface 2. These tubular sections 8 are preferably only formed in a sub-area of the sitting surface 2, in which sub-area the main load of a person seated on the seat appears. As illustrated, the tubular sections 8 can be arranged in several rows next to or behind each other. Preferably, the individual tubular sections 8 are each separated from each other by fissures 10 on all sides (see FIG. 2), so that each can move and vibrate relatively freely.

The tubular sections 8 each feature a hole 12, wherein all of these holes 12 or at least some of the holes 12 extend through the core part 4 completely, including the base part 6, and are consequently open on both sides, top and bottom.

Figure 2:
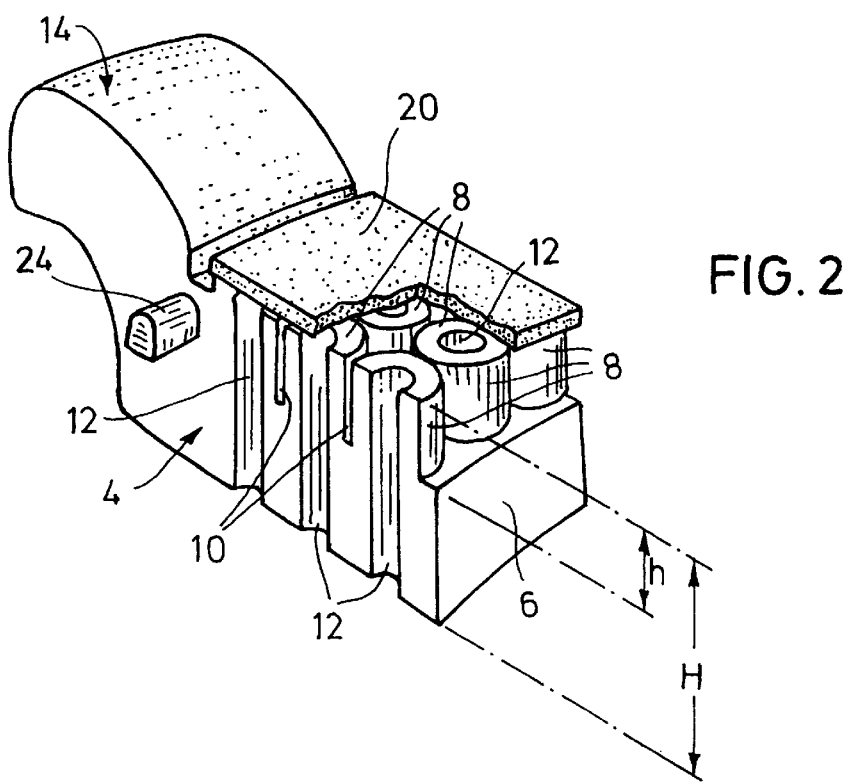

As illustrated in FIG. 2, the tubular sections 8 proceed from the base section 6 and extend across an open length (height h) that corresponds to approximately half of the total height H of core part 4.

The tubular sections 8 according to invention are first of all primarily responsible for the physical properties, above all the mechanical and elastic properties. For optimum design of the seating comfort in this respect, it can be provided that the tubular sections 8 be designed differently across the sitting surface 2, at least partially as far as their mechanical and elastic properties are concerned, preferably by different shape factors alone, in particular by different cross sections (different shapes and/or surface areas) and/or by different open lengths or heights, h, preferably with identical properties specific to the material in other respects. The tubular sections 8 are each designed with ring-shaped cross sections in the illustrated, preferred embodiment. In this case, the tubular sections 8 can at least partially feature different inner and/or outer diameters to grant them different physical properties. Other cross sectional shapes may also be possible, such as polygonal, possibly honeycombed.

According to invention, the core part 4 can consequently be uniformly manufactured from the same plastic foam (monofoam), which is particularly favorable for its manufacture. Certainly, it lies within the invention's scope to manufacture the core part 4 out of different foam materials (2-zone foam), especially in an edge area 14 adjacent to the area of the tubular sections 8. This embodiment is illustrated in FIG. 1. A formed separating fabric 16 is preferably imbedded between the different foam materials in this case. This formed separating fabric 16 can feature holes 18, through which the different foam materials materially connect with each other.

The core part 4 preferably consists of a PUR cold-curing foam. This material features a crushing strength of approximately 10.5 kPa in particular, especially in the area of the tubular section 8. In the case of a 2-zone foam, especially in edge area 14, the other foam material can have a crushing strength of approximately 13.5 kPa.

It is moreover advantageous for an outer layer 20 to be arranged on the core part 4, at least covering the area of the tubular sections 8. This outer layer 20 thus lies atop the open, top faces of the tubular sections 8. This outer layer 20 has two objectives according to invention. First, it optimally distributes the sitting pressure; i.e. it optimally introduces and distributes the weight into or onto the individual tubular sections 8. Secondly, the outer layer 20 also guarantees optimal movement of moisture away from the sitting surface 2 downwards through the holes 12 of the tubular sections 8 and core part 4.

For this purpose, a material that can quickly collect moisture and surrender it again within a very short time is used for the outer layer 20. A formed fabric that can be obtained from Freudenberg under the designation ST1400C is particularly suitable for this. We are dealing with a material that has a mass per unit area of 600 g/m$^2$ and a thickness of 5 mm. This material consists of 70% polyester and 30% synthetic wool. However, any other suitable material, such as rubberized hair, latex, chopped foam, and the like can be used for the aforementioned climatic function.

Finally, let it be mentioned that core part 4, including the preferably provided outer layer 20, is at least partially covered with a coating material 22. Conventionally, this involves a textile material, leather or artificial leather. In the illustrated embodiment, the coating material 22 is fastened by indetectable holding straps, which are fed into the core part through slots in the core part 4. At least one strip-shaped retaining element 24, which extends through the holding straps, is arranged within the core part 4. These retaining elements 24 are made as relatively soft plastic profiles ("soft strip"), especially with a bulk density of about 85 kg/m$^3$. With the holding straps being fastened in the core part 4 in such a practical manner, the surface profile or relief contour of the sitting surface 2 can be achieved.

The seat cushion 1 according to invention is to be empirically or computationally designed for the respective application. The number and the dimensions of the tubular sections 8 are arranged according to the load on the sitting surface and are also a function of the thickness and hardness of the foam used. In addition, the final adjustment of the sitting pressure distribution enters into the design of the tubular sections. It would also be conceivable for the surface that is supported by the tubular sections not to be made rectangular, as shown in the picture, but fit to the contact surface of the buttocks for example. The different sitting pressures could also result in different dimensions for the tubular sections, which would again lead to an irregular arrangement of the tubes and could affect the distances between the fissures accordingly. This similarly applies to the heights of the tubular sections, wherein buckling resistance is also to be considered. The entire system can be matched to the respective seat type by computational methods (FEM calculations).

The invention is not limited to the illustrated and described examples, but also includes all embodiments that operate identically to the spirit of the invention. Moreover, the invention is not yet restricted to the combination of characteristics defined in claim 1, but can also be defined by any other arbitrary combination of particular features of all the disclosed individual characteristics as a whole. This means that, in principle, practically each individual characteristic of claim 1 can be omitted and replaced by at least one individual characteristic disclosed elsewhere in the application. In this respect, claim 1 is to be understood merely as a first attempt at formulating an invention.

What is claimed is:

1. A seat cushion for vehicle seats, the seat cushion comprising:
    a seating surface; and
    a core including a plurality of cylindrical tubular sections generally extending perpendicular to the seating surface, wherein the tubular sections define holes that extend through the core and are open on both sides.

2. The seat cushion as recited in claim 1 wherein the core includes a base integrally molded with the tubular sections, the tubular sections extend from the base across a height that corresponds to approximately half of the total height of the core.

3. The seat cushion as recited in claim 1 wherein the tubular sections are configured to provide varying mechanical properties.

4. The seat cushion as recited in claim 3 wherein the tubular sections are each designed with ring-shaped cross sections.

5. The seat cushion as recited in claim 3 wherein the tubular sections at least partially include different inner or outer diameters.

6. The seat cushion as recited in claim 3 wherein the core consists of different foam materials.

7. The seat cushion as recited in claim 6 further including a formed separating fabric disposed between the different foam materials.

8. The seat cushion as recited in claim 3 wherein the varying properties is one of a group consisting of elastic properties, shape configurations, cross-sections, dimensional properties, and materials.

9. The seat cushion as recited in claim 1 wherein the individual tubular sections are each separated from each other by fissures.

10. The seat cushion as recited in claim 1 wherein the core consists of a PUR cold-curing foam.

11. The seat cushion as recited in claim 1 further including an outer layer arranged on the core, the outer layer covering the tubular sections.

12. The seat cushion as recited in claim 1 wherein the core is at least partially covered with a coating material.

13. The seat cushion as recited in claim 12 wherein the coating material is fastened by one or more holding straps disposed in slots in the core, the holding straps including at least one retaining element arranged within the core.

14. The seat cushion as recited in claim 13 wherein the retaining element is formed from a relatively soft plastic profile.

15. The seat cushion as recited in claim 1 wherein the seating surface is a bottom seat.

16. The seat cushion as recited in claim 1 wherein the seating surface is a seat back.

17. A passive ventilation system for vehicle seats, the passive ventilation system comprising:

a seating surface; and a core including a base and a plurality of tubular sections integrally formed with the base and generally extending perpendicular to the seating surface, wherein the plurality of tubular sections comprise a first tubular section extending substantially parallel to an adjacent second tubular section, and wherein the tubular sections define holes that extend through the core and are open on both sides.

18. The passive ventilation system as recited in claim 17 wherein the tubular sections are configured to provide varying mechanical properties.

19. A seat cushion for vehicle seats, the seat cushion comprising:

a seating surface; and a core comprising different foam materials and including one or more tubular sections generally extending perpendicular to the seating surface, and a formed separating fabric having one or more holes, wherein the formed separating fabric is disposed between the different foam materials.

20. The seat cushion as recited in claim 19 wherein the different foam materials are materially connected through the one or more holes in the formed separating fabric.

* * * * *